(12) United States Patent
Guthrie et al.

(10) Patent No.: US 8,066,892 B2
(45) Date of Patent: Nov. 29, 2011

(54) METHOD FOR MANUFACTURING A PERPENDICULAR MAGNETIC WRITE HEAD WITH A WRAP AROUND SHIELD

(75) Inventors: Hung-Chin Guthrie, Saratoga, CA (US); Yimin Hsu, Sunnyvale, CA (US); Ming Jiang, San Jose, CA (US); Sue Siyang Zhang, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 550 days.

(21) Appl. No.: 12/241,751

(22) Filed: Sep. 30, 2008

(65) Prior Publication Data
US 2010/0078406 A1    Apr. 1, 2010

(51) Int. Cl.
*B44C 1/22*      (2006.01)
(52) U.S. Cl. .............. 216/22; 216/75; 216/89; 438/692; 438/713
(58) Field of Classification Search .............. 216/22, 216/89, 90, 75; 438/720, 722, 692, 713, 438/740, 717
See application file for complete search history.

(56) References Cited

U.S. PATENT DOCUMENTS

| | | | |
|---|---|---|---|
| 6,804,879 B2 | 10/2004 | Hsiao et al. | 29/603.24 |
| 6,870,712 B2 | 3/2005 | Chen et al. | 360/317 |
| 7,070,698 B2 | 7/2006 | Le | 216/22 |
| 7,092,205 B1 | 8/2006 | Pitcher et al. | 360/126 |
| 7,272,883 B2 | 9/2007 | Le et al. | 29/603.16 |
| 7,296,338 B2 | 11/2007 | Le et al. | 29/603.16 |
| 2003/0188422 A1* | 10/2003 | Hashimoto et al. | 29/603.14 |
| 2004/0177493 A1 | 9/2004 | Hsiao et al. | 29/603.23 |
| 2004/0218312 A1 | 11/2004 | Matono | 360/317 |
| 2005/0024764 A1 | 2/2005 | Hsiao et al. | 360/123 |
| 2005/0047013 A1 | 3/2005 | Le et al. | 360/126 |
| 2006/0044681 A1* | 3/2006 | Le et al. | 360/126 |
| 2006/0245109 A1 | 11/2006 | Hsu et al. | 360/126 |

* cited by examiner

*Primary Examiner* — Lan Vinh
(74) *Attorney, Agent, or Firm* — Zilka-Kotab, PC (57) ABSTRACT

A method for manufacturing a write pole for a perpendicular magnetic write head. The method employs a damascene process to construct the write pole with a very accurately controlled track width. The method includes depositing a layer of material that can be readily removed by reactive ion etching. This material can be referred to as a RIEable material. A mask is formed over the RIEable material and a reactive ion etching is performed to form a tapered trench in the RIEable material. A CMP stop layer can the be deposited, and a write pole plated into the trench. A CMP can then be performed to define the trailing edge of the write pole. Another masking, etching and plating step can be performed to form a trailing, wrap-around magnetic shield.

20 Claims, 14 Drawing Sheets

METHOD FOR MANUFACTURING A PERPENDICULAR MAGNETIC WRITE HEAD WITH A WRAP AROUND SHIELD

FIELD OF THE INVENTION

The present invention relates to perpendicular magnetic recording and more particularly to damascene method for manufacturing a write pole and wrap-around trailing shield of a write head.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a method for manufacturing a magnetic write head. The method includes providing a substrate and then depositing a RIEable material on the substrate. A first mask structure is formed over the RIEable material, the first mask structure having an opening configured to define a write pole. Then, a reactive ion etching is performed to remove portions of the RIEable material that are not protected by the first mask structure. A CMP stop layer is then deposited, and a first magnetic material is deposited to form the write pole material. A chemical mechanical polishing process is then performed to define the trailing edge of the write pole. A second mask structure is then performed to cover an area over the trench, leaving side areas uncovered. Then, a material removal process such as a reactive ion milling (RIM) or a second reactive ion etching (RIE) is performed to remove material not protected by the second mask structure, at the sides of the write pole. The second mask structure can then be removed and a second magnetic material can be deposited to form a trailing, wrap-around magnetic shield.

The write pole width (track width) and write pole bevel angle can be controlled by the photolithographic process used to define the first mask structure or by the manner in which the reactive ion etching process is performed.

The write pole ion milling process can advantageously be eliminated, thereby avoiding damage to the write pole. Also, a method according to the present invention allows for better control of critical dimensions, such as track width.

The write pole can be deposited by electroplating, but can also be deposited by another method such as sputter deposition. The write pole material can be, for example, CoFe, CoFeB, CoNiFe or NiFe.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
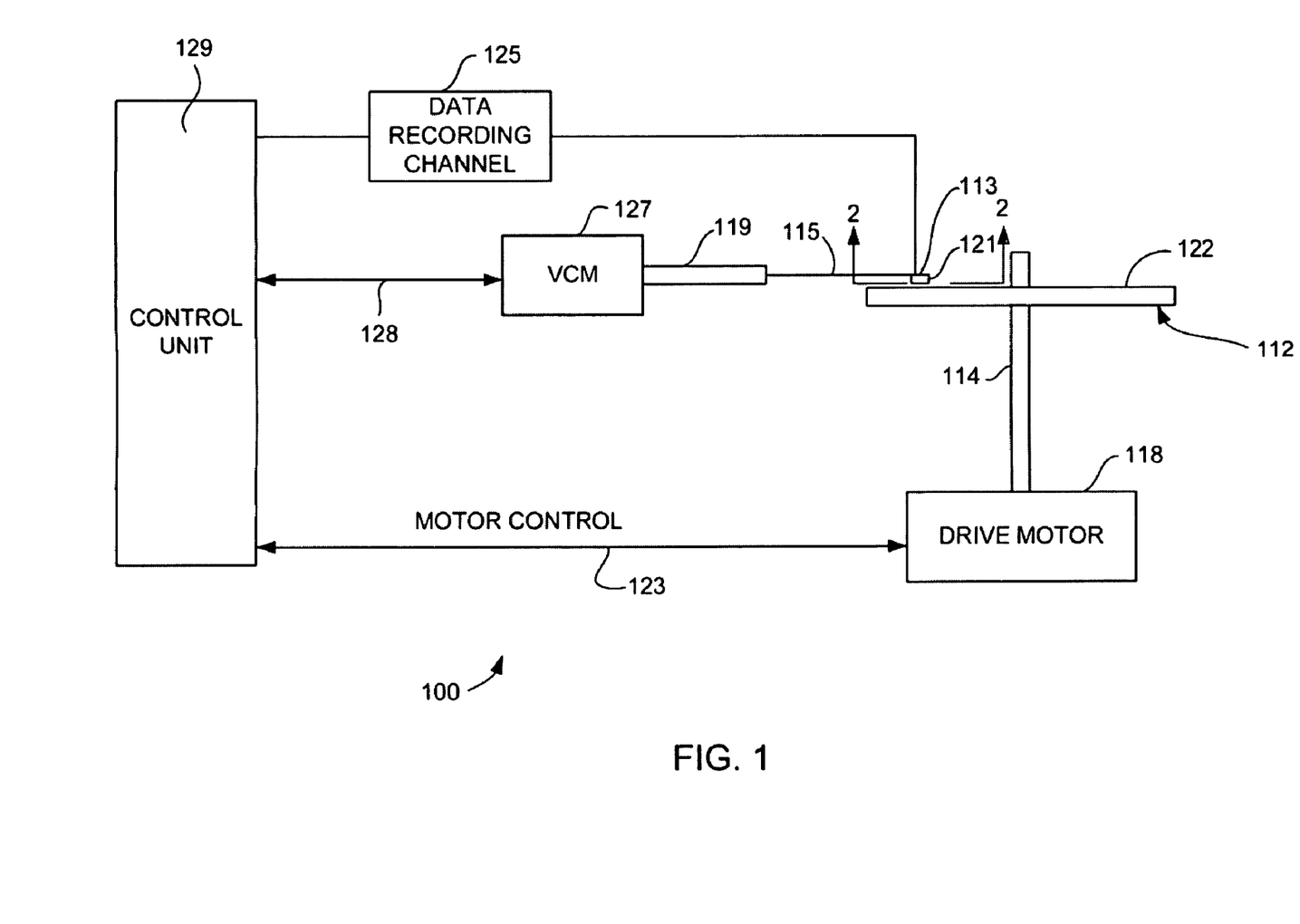
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
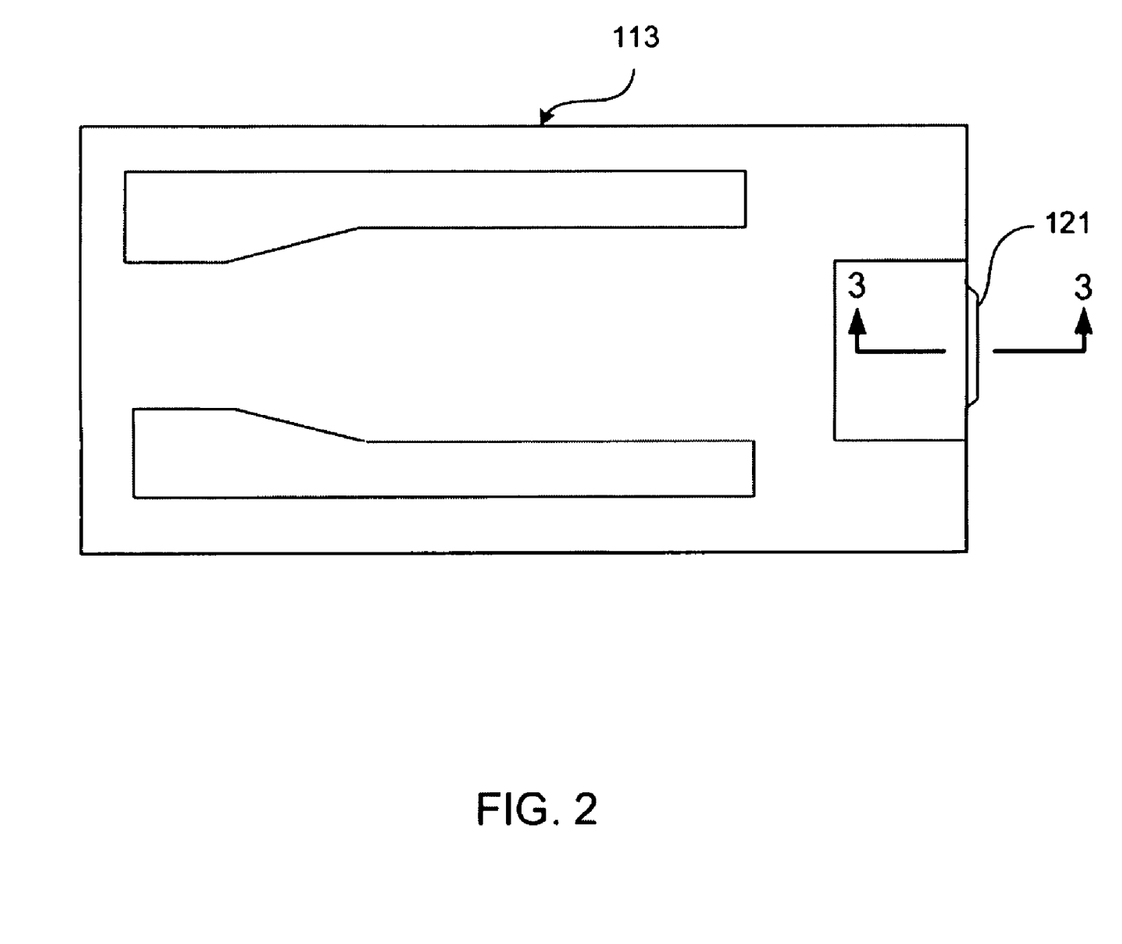
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
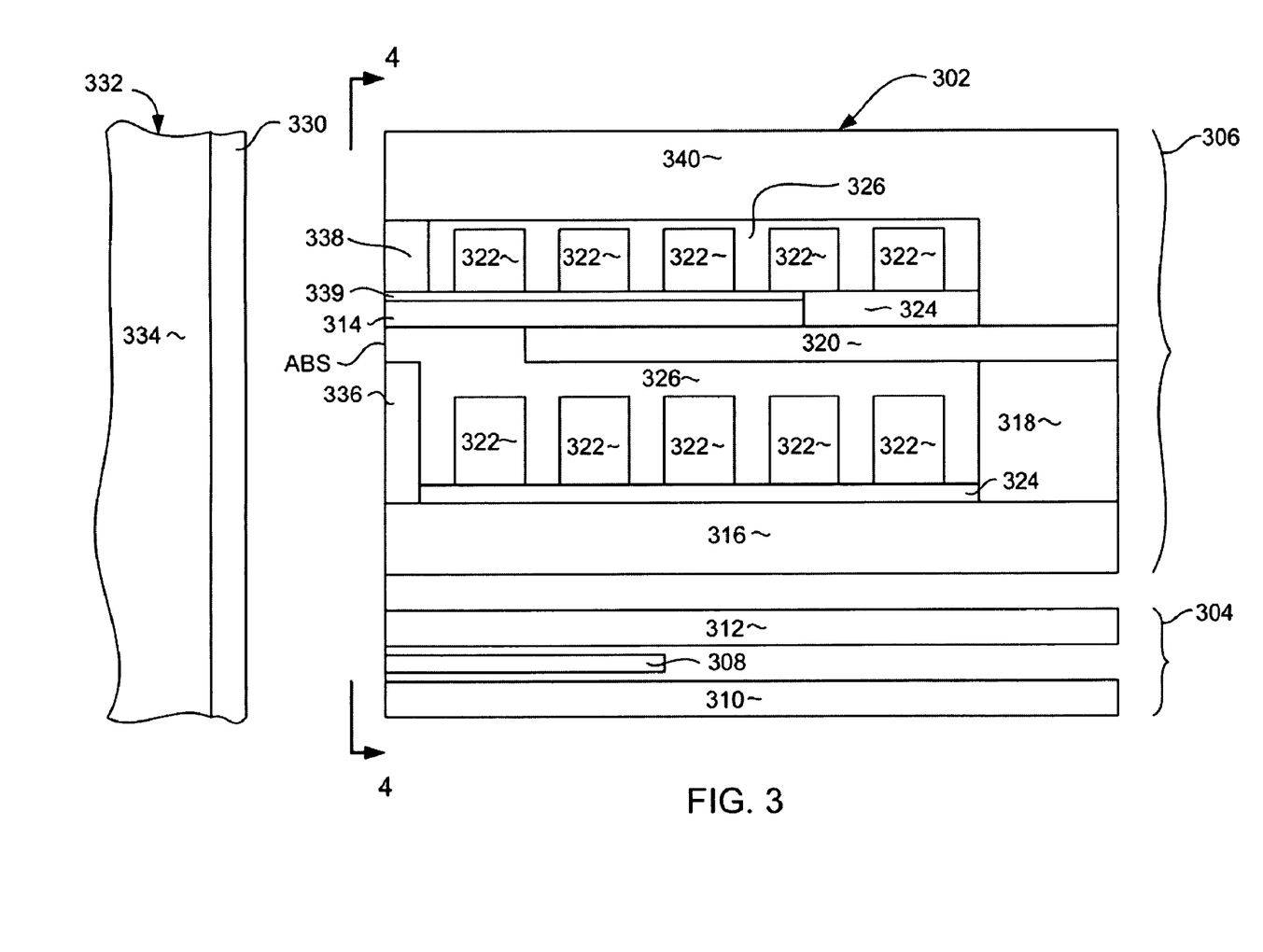
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322. A resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and week that it does not erase the data bit recorded by the write head 314. A magnetic pedestal 336 can be provided at the ABS, and attached to the leading return pole 316 to act as a magnetic shield to prevent stray field from the write coil 322 from inadvertently reaching the magnetic media 332.

In order to increase write field gradient, and therefore, increase the speed with which the write head 306 can write data, a trailing, magnetic shield 338 can be provided. The trailing, magnetic shield 338 is separated from the write pole by a non-magnetic write gap 339, and may be connected with the shaping layer 320 and/or back gap 318 by a trailing return pole 340. The trailing shield 338 attracts the magnetic field from the write pole 314, which slightly cants the angle of the magnetic field emitting from the write pole 314. This canting of the write field increases the speed with which write field polarity can be switched by increasing the field gradient. The non-magnetic trailing gap layer 339 can be constructed of a material such as Rh, Ir or Ta.

Figure 4:
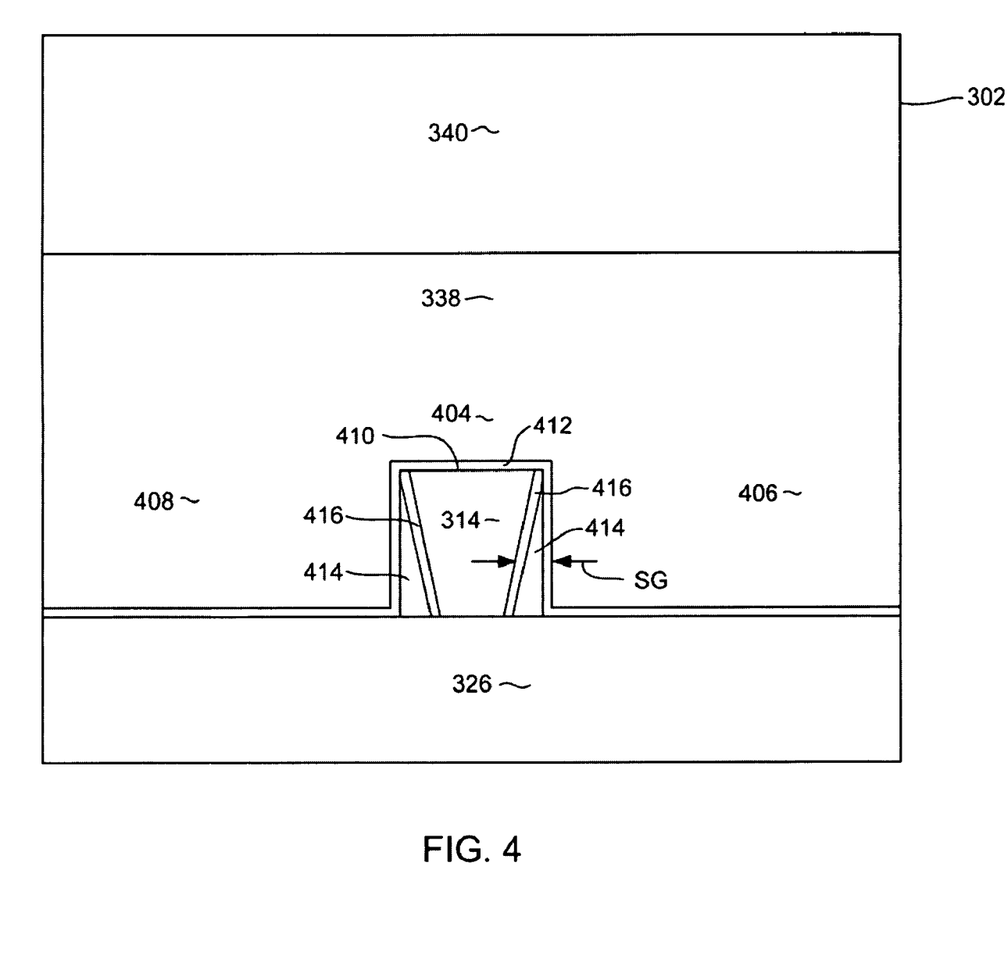
FIG. 4 is an enlarged, air bearing surface view of a portion of a magnetic write head, as seen from line 4-4 of FIG. 3.

FIG. 4, shows an enlarged, air bearing surface view of a portion of the head 302 as taken from line 4-4 of FIG. 3. As can be seen, the write pole 314 has a trapezoidal cross section as viewed from the air bearing surface. Also, the shield 338 wraps around the sides of the write pole 314 to form a wrap-around shield. Therefore, the shield 338 has a trailing portion 404, and first and second side shield portions 406, 408. The trailing portion 404 is separated from the trailing edge 410 of the write pole 314 by a non-magnetic trailing gap layer 412, that preferably extends beyond the write pole as shown. The reason for this will become clearer below where a method for manufacturing the write head will be described.

The side portions 406, 408 of the write shield 334 are separated from the sides of the write pole 314 by a non-magnetic gap SG that can include several layers such as the layer 310 described above, as well as a layer of RIEable material 414 and CMP stop layer 416 both of which will be described in greater detail below.

Figure 5:
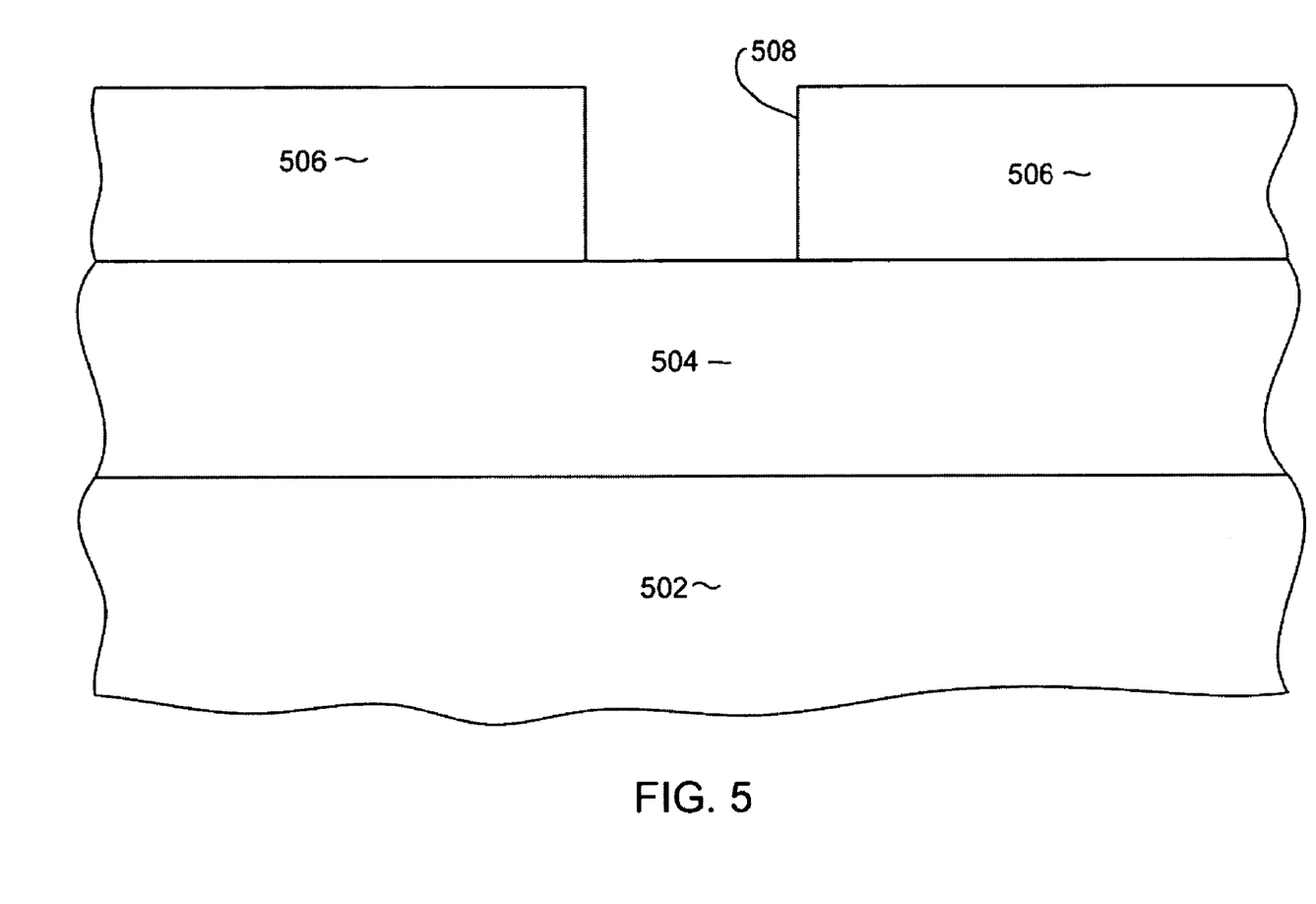
FIGS. 5-14 are illustrations of a portion of a write head in various intermediate stages of manufacture, illustrating a method of manufacturing a write head according to an embodiment of the invention.

With reference now to FIGS. 5-14, a method for manufacturing a write head according to an embodiment of the invention will be described. With particular reference to FIG. 5, a layer of material that can be readily removed by reactive ion etching (RIEable layer) 504 is deposited over a substrate 502. The substrate 502 can include the insulation layer 326, and all or a portion of the shaping layer 320 described above with reference to FIG. 3. The RIEable material 504 can be a material such as alumina, SiC, SiO$_x$, Ta or TaO$_x$, although other materials could also be used. The mask structure 506 can be constructed of a photolithographically patterned photoresist, and may also include other layers such as one or more hard mask layers and/or an antireflective layer (not shown). The mask 506 is formed with an opening 508 that is configured to define a desired shape of a write pole.

Figure 6:
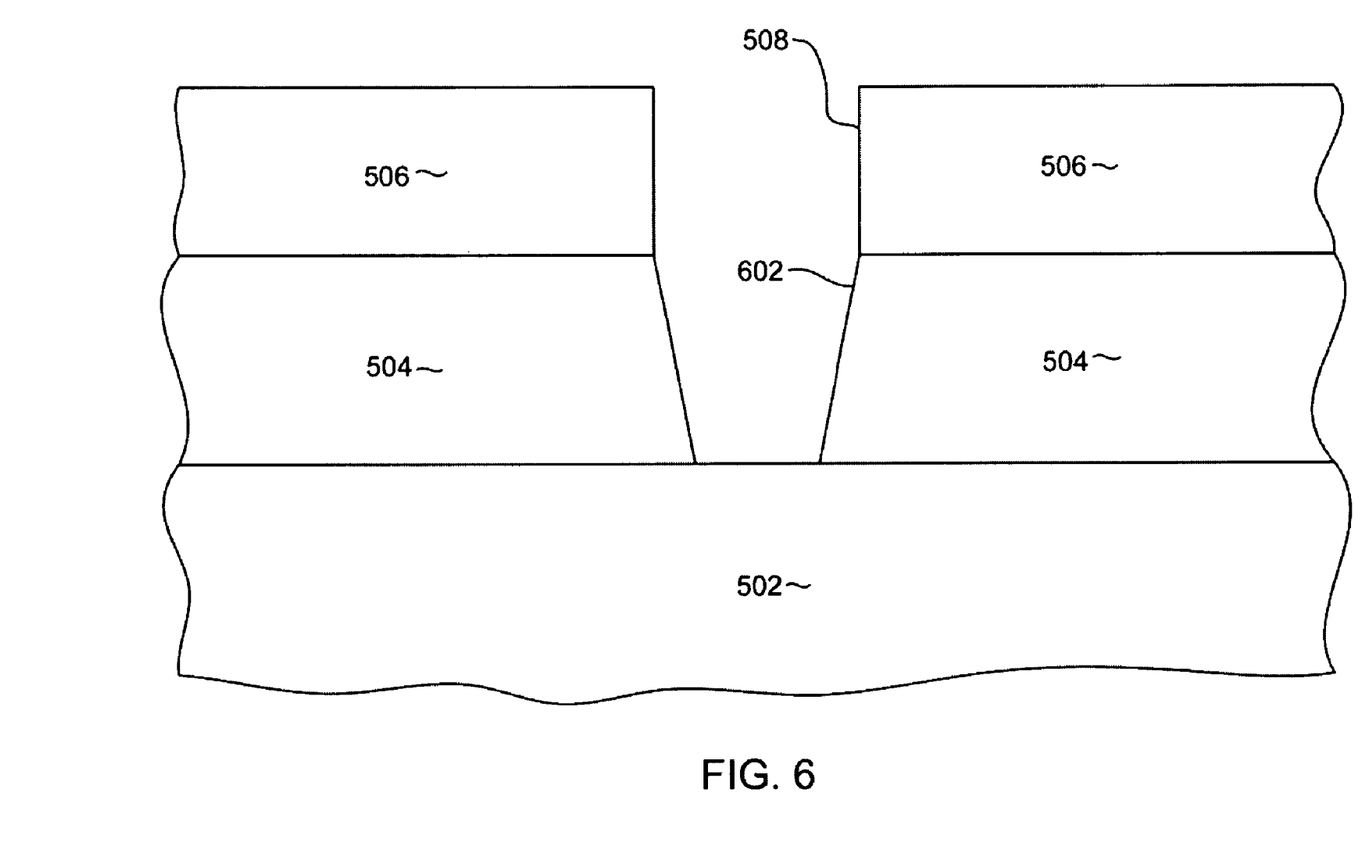

With reference now to FIG. 6, a reactive ion etching (RIE) is performed to remove portions of the RIEable material layer 504 that are not protected by the mask 506. This forms an opening or trench in the RIEable layer 504. The RIE is preferably performed in such a manner that the trench in the RIEable layer is formed with tapered sidewalls 602 such that the trench is narrower at the bottom than at the top, as shown in FIG. 6. Therefore, the width of the trench at the top of the trench is defined by the photolithographic process used to pattern the mask 506, while the bevel angle is controlled by the RIE. In order to form the tapered side walls 602, RIE chemistries, such as Chlorine, Fluorine and Argon, are used. Specific RIE process conditions are also required for different type of RIEable materials. After the RIE has been performed, the mask 506 can be lifted off. By way of example, for if the RIEable layer 504 is alumina, the RIE process can be performed using a chemistry such as BC13/C12, with a chemical ratio, process pressure and top/bottom RF power chosen to provide a desired taper angle of the side wall 602.

Figure 7:
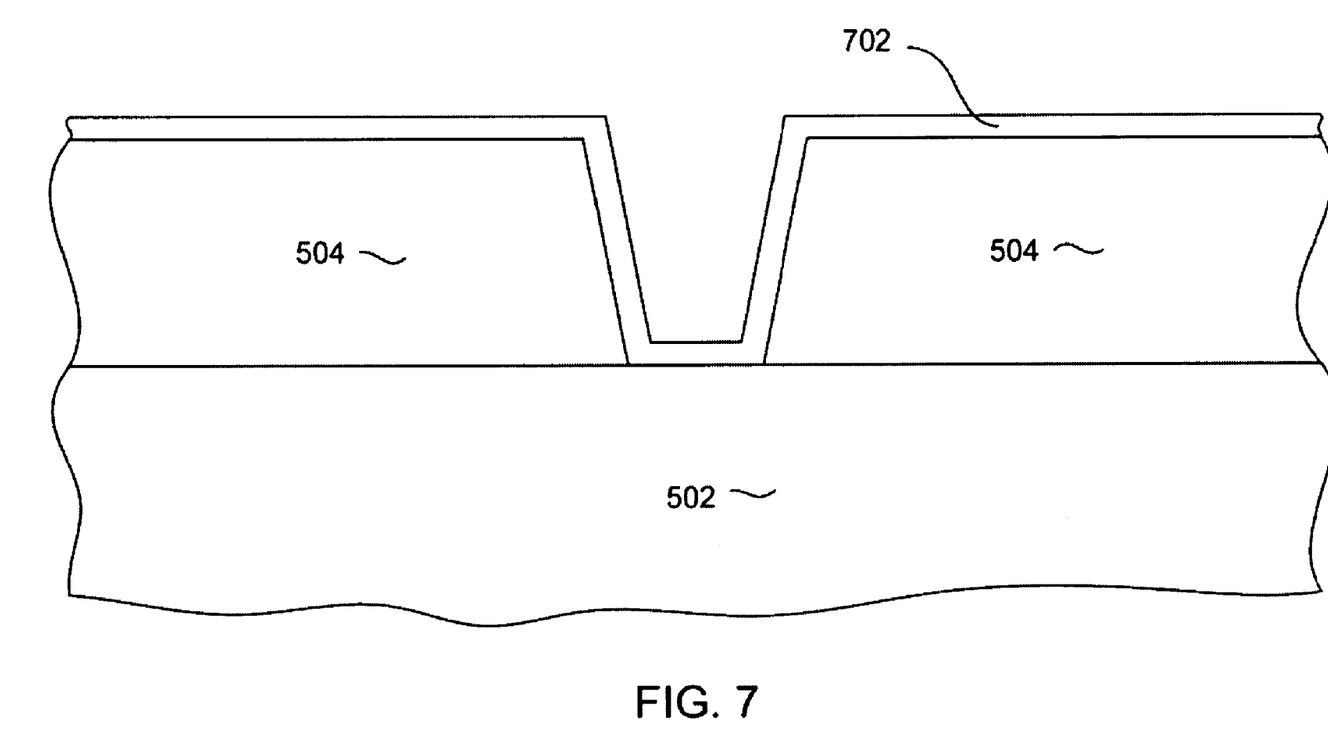

With reference now to FIG. 7, a layer of material 702 that can function as both a seed layer and a CMP stop layer is deposited. The layer 702 is, therefore, a material that is resistant to chemical mechanical polishing while also preferably being electrically conductive and non-magnetic. To this end, the layer 702 can be Rh, Ru, Ir or Cr, and is most preferably Rh.

Figure 8:
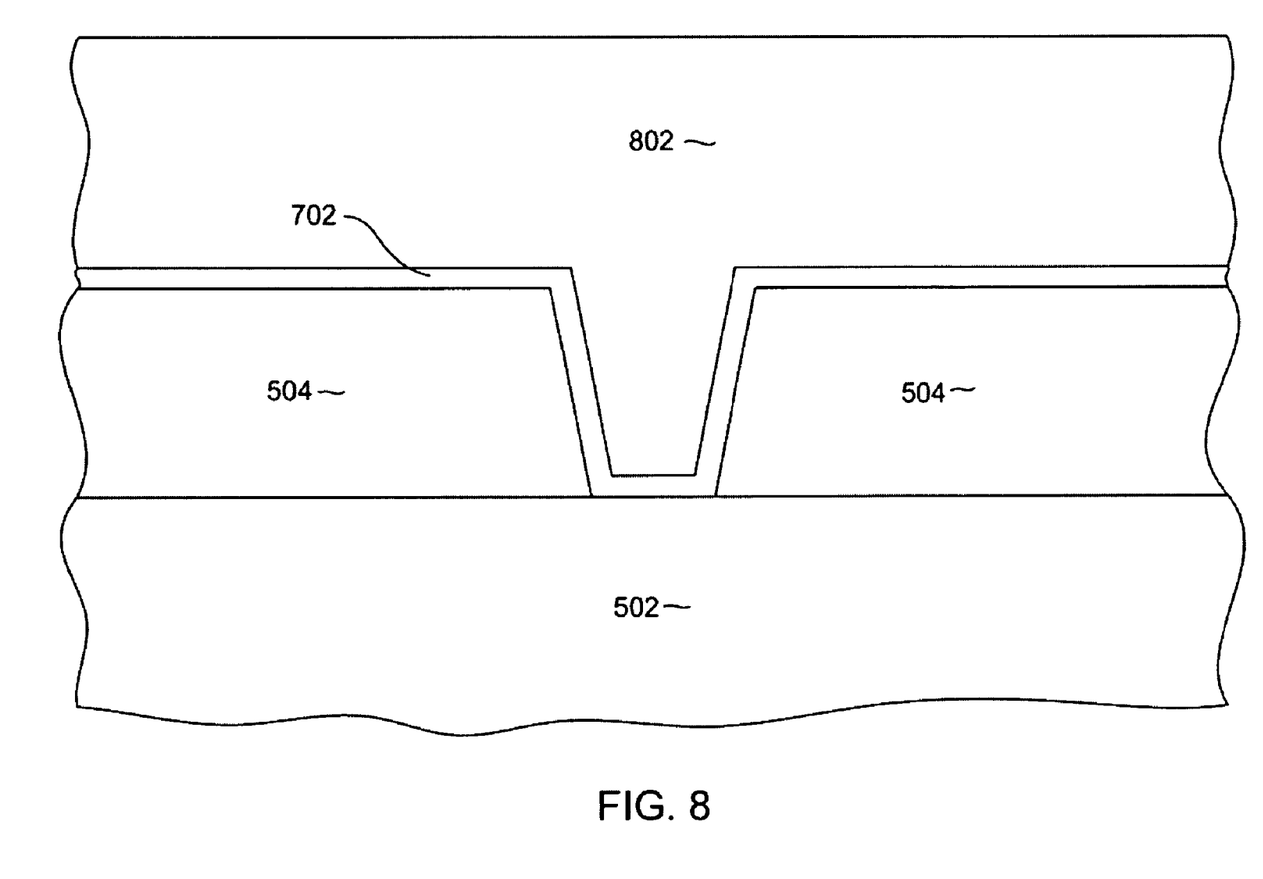

Thereafter, with reference to FIG. 8 a magnetic material 802 is electroplated to a sufficient thickness to completely fill the trench as shown in FIG. 8. This magnetic material can be, CoFe, CoFeB, CoNiFe or NiFe. In addition, as an alternative to electroplating, the magnetic material 802 can be sputter deposited, but cannot be laminated.

Figure 9:
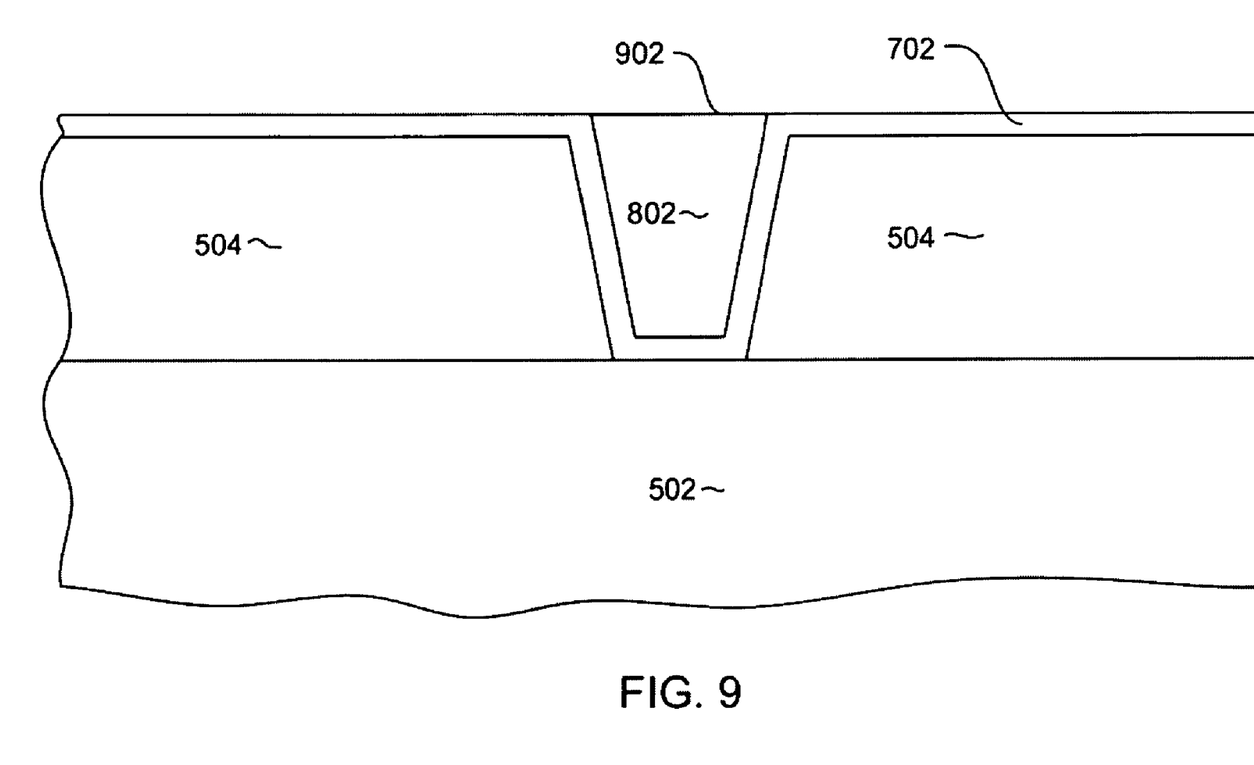

With reference now to FIG. 9, after the magnetic material 802 has been deposited, a chemical mechanical polishing process (CMP) is performed. The CMP is performed until the CMP stop layer 702 has been reached. As can be seen, this forms a smooth upper surface 902 on the magnetic layer 802 that is parallel with the top of the CMP stop layer 702. This upper surface 902 will form the trailing edge 412 of the write pole 314 that was described above with reference to FIG. 4.

Figure 10:
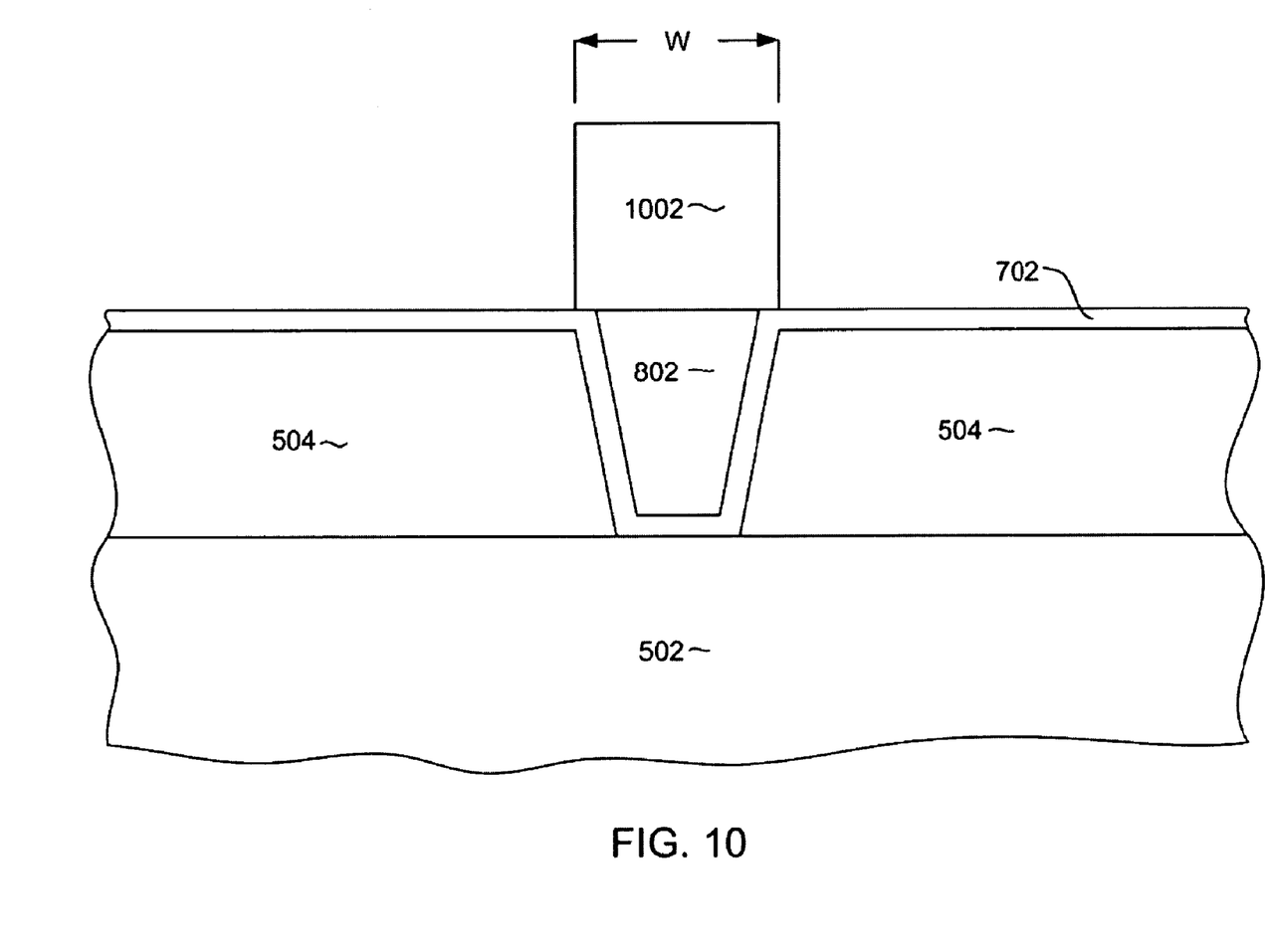
Figure 11:
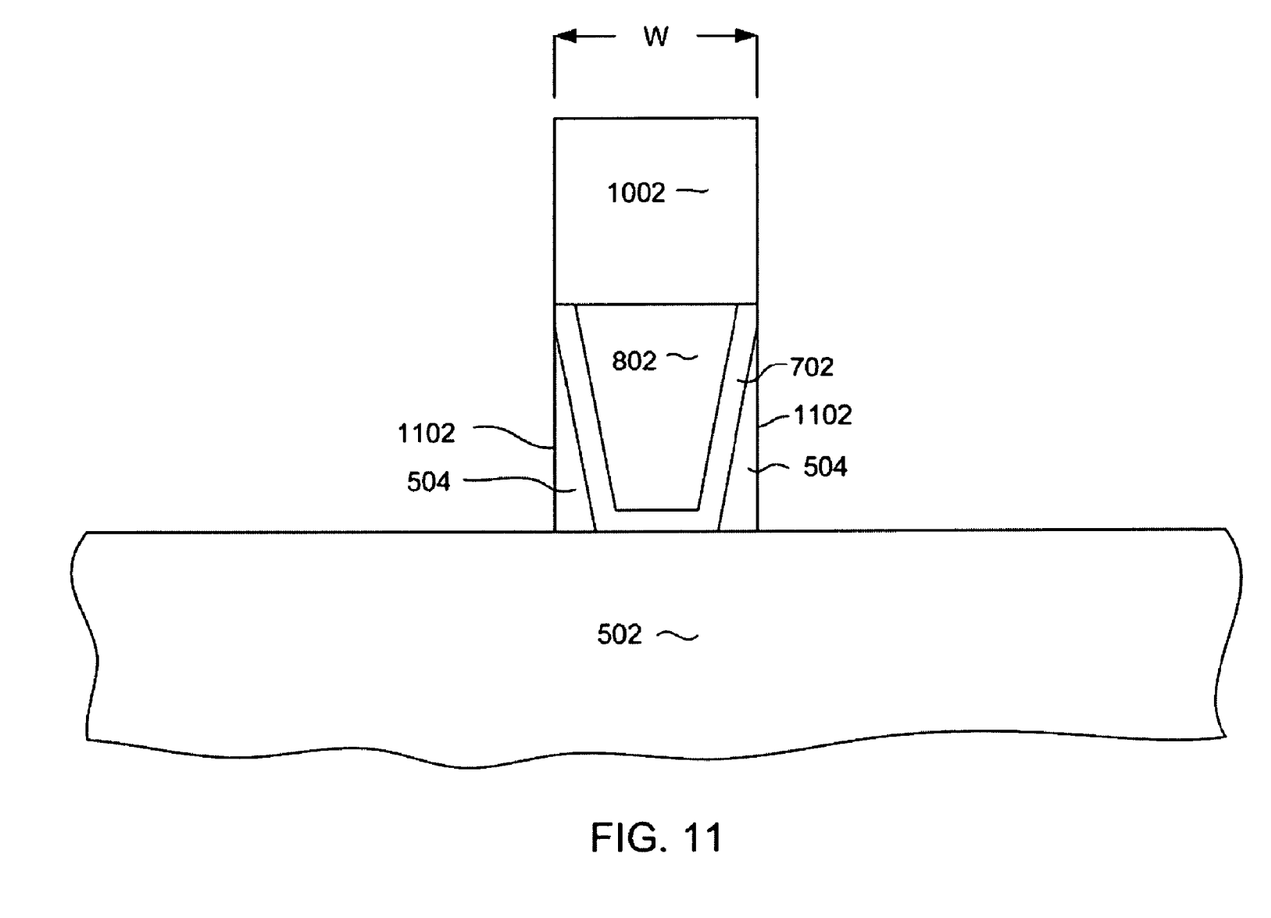
Figure 12:
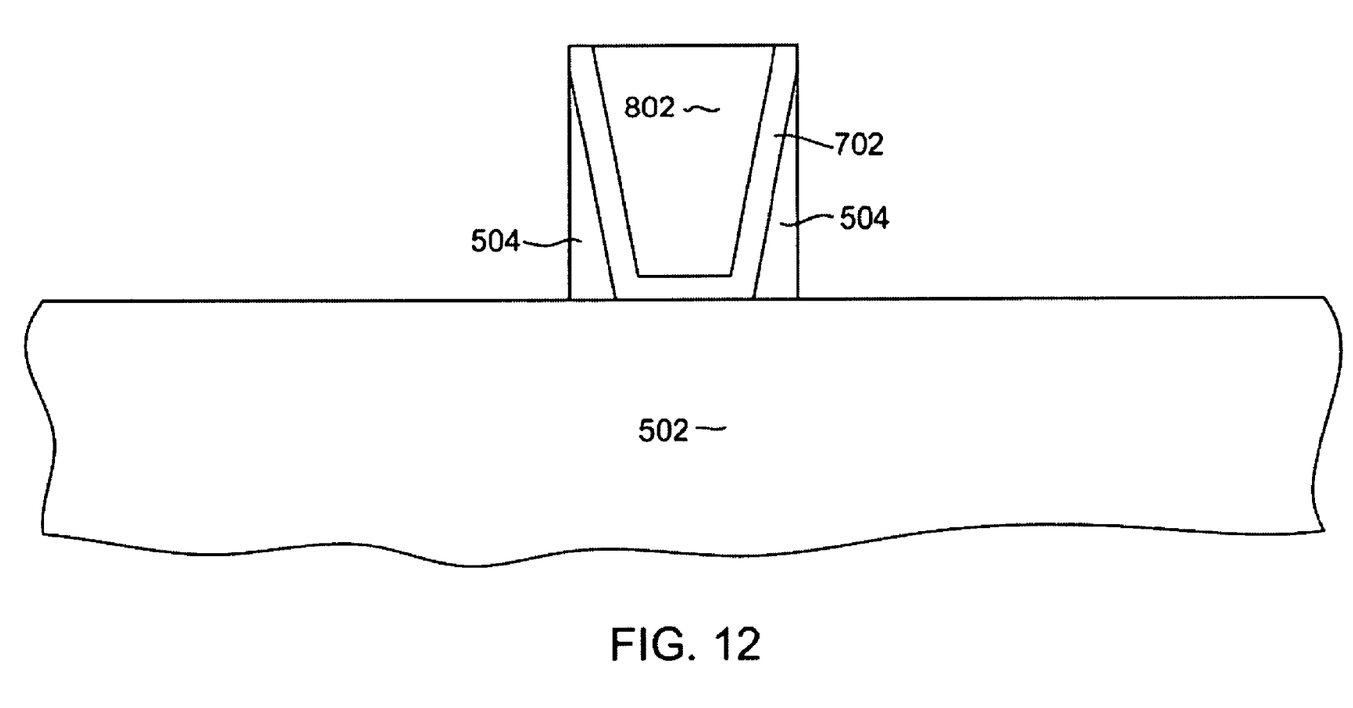

With reference now to FIG. 10, a second mask 1002 is formed. This mask has a desired width W that will affect the width of side gaps of a yet to be formed shield, as will become apparent below. After forming the mask, a material removal process such as reactive ion etching (RIE) or reactive ion milling (RIM) is performed to remove portions of the CMP stop layer 702 and RIEable layer 504 that are not protected by the second mask 1002. This results in a structure such as that shown in FIG. 11. Because of the bevel angle formed by the previous RIE (described above with reference to FIG. 6) a portion of the RIEable material 504 may remain as shown in FIG. 11. This remaining portion of the RIEable layer 504 may have a substantially triangular cross section with a vertical side wall 1102 as shown in FIG. 11. After this material removal process (i.e. second RIM or second RIE) has been performed, the second mask structure 1002 can be lifted off, resulting in a structure such as that shown in FIG. 12.

Figure 13:
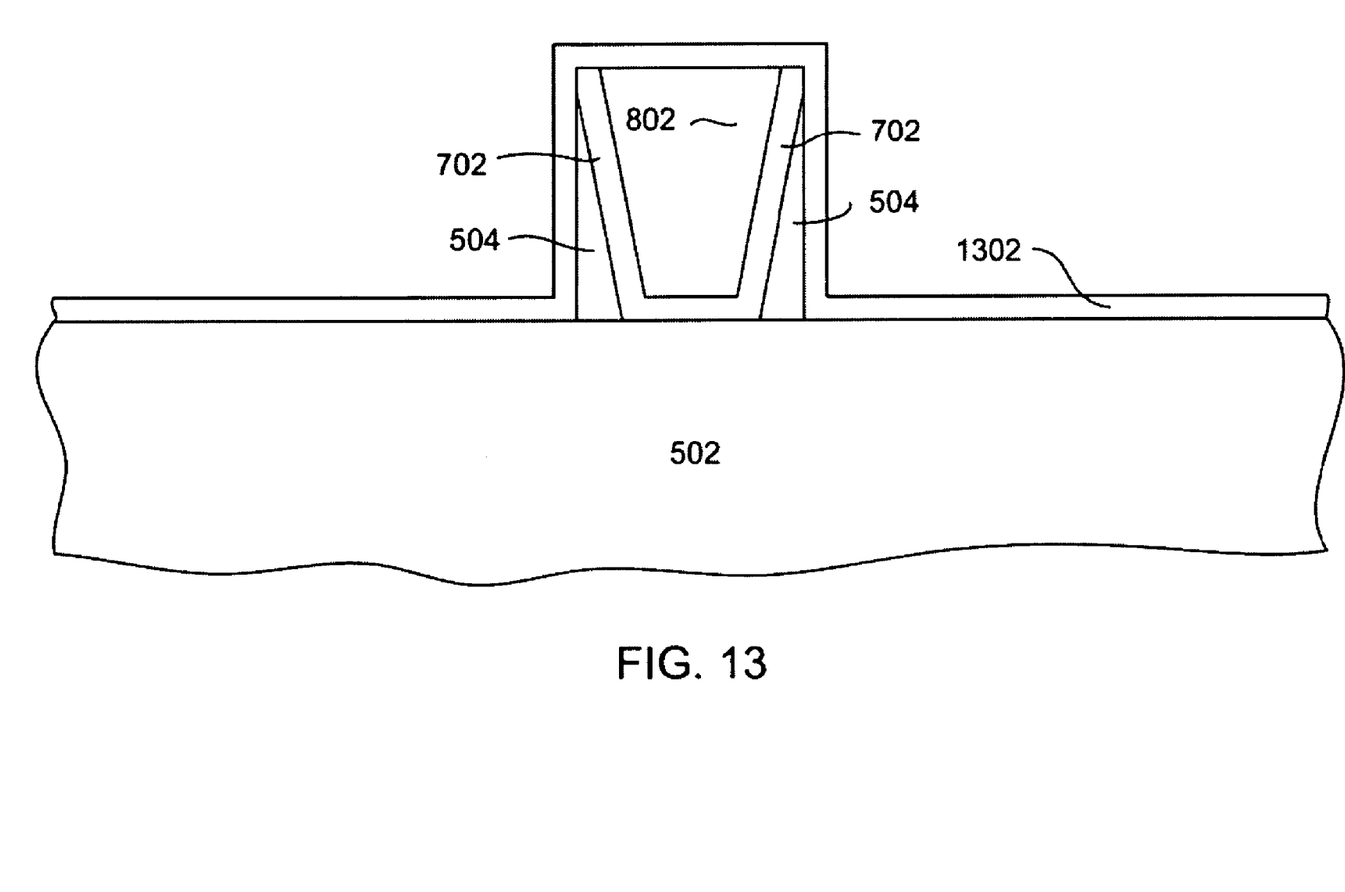
Figure 14:
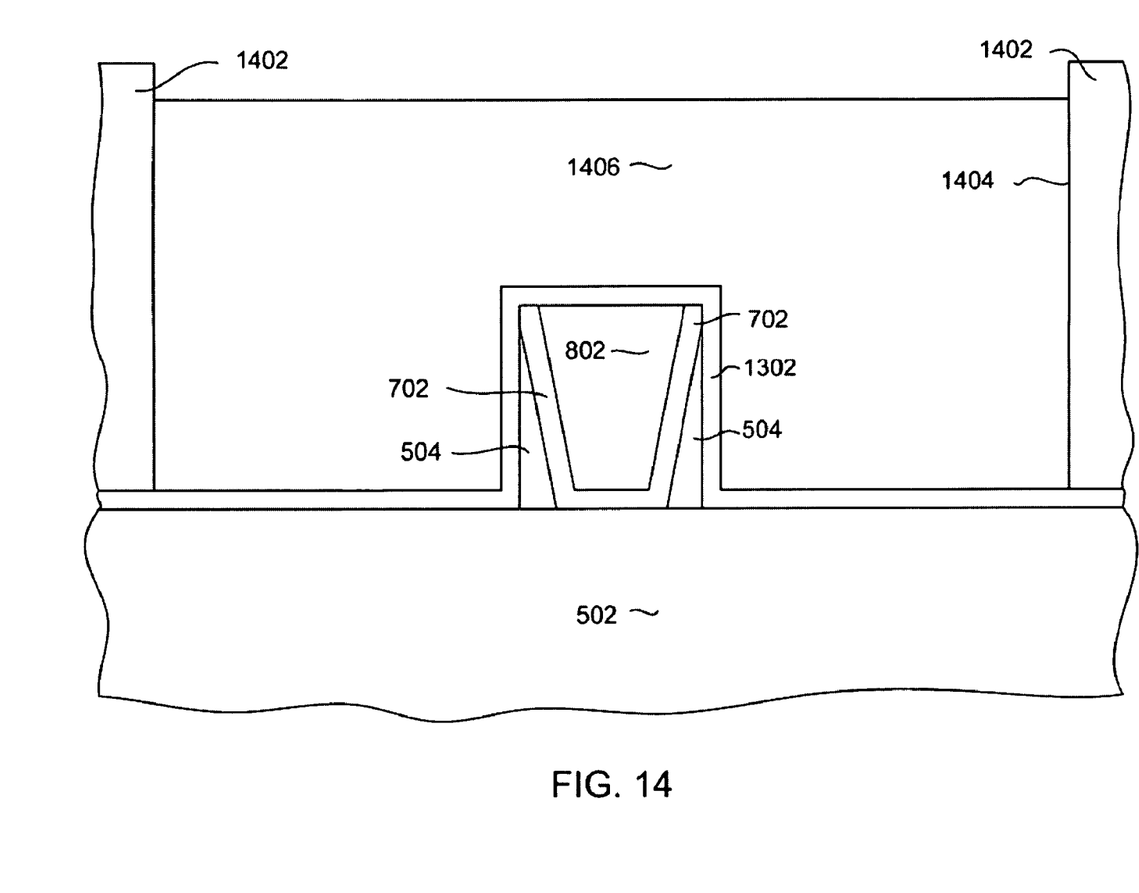

With reference to FIG. 13, a layer of material 1302 can be deposited. The material 1302 can be an electrically conductive, non-magnetic material that can function as both an electroplating seed and as a non-magnetic shield gap, as will be seen. Then, with reference to FIG. 14, after depositing the seed gap layer 1302, a frame mask 1402 is constructed having an opening 1404 configured to define a trailing wrap-around magnetic shield structure. A magnetic material 1406 is then deposited into the opening. The magnetic material 1406 can be, for example, CoFe or NiFe. The magnetic material is preferably deposited by electroplating, using the seed layer 1302 as an electroplating seed. However, the magnetic material 1406 could also be deposited by a process such as sputter deposition, in which case an electrically conductive seed layer would not be needed. In that case, the layer 1302 would not need to be electrically conductive. After the magnetic material 1406 has been deposited, the frame mask 1402 can be removed.

As can be seen then, the above process provides a method for manufacturing a write head with a write pole and trailing, wrap-around magnetic shield, wherein the write pole has a very well controlled track width. As a result of the above described process, the magnetic material 802, forms the write pole 314 described above with reference to FIG. 4, and the magnetic material 1406 forms the shield 338 also described above with reference to FIG. 4. In addition, the RIEable material 504 of FIG. 14 corresponds to material layer 414 of FIG. 4, layer 702 of FIG. 14 corresponds to layer 416 of FIG. 4 and layer 1302 of FIG. 14 corresponds to layer 412 of FIG. 4.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
    providing a substrate;
    depositing a material that can be removed by reactive ion etching (RIEable material);
    forming a first mask structure over the RIEable material, the first mask structure having an opening configured to define a write pole;
    performing a reactive ion etching to remove portions of the RIEable material that are not protected by the first mask structure;
    depositing a layer of material that is resistant to chemical mechanical polishing (CMP stop layer);
    depositing a first magnetic material into the trench formed in the RIEable material to provide a write pole material;
    performing a chemical mechanical polishing to define a write pole and a trailing edge of the write pole;
    forming a second mask structure, the second mask structure covering an area over the write pole;
    performing a material removal process to remove portions of the RIEable layer that are not protected by the second mask structure;
    removing the second mask structure;
    depositing a non-magnetic gap layer; and
    depositing a second magnetic material to form a magnetic shield.

2. The method as in claim 1, wherein the reactive ion etching is performed so as to form tapered side walls in the trench.

3. The method as in claim 1, wherein the reactive ion etching is performed with chemistries including Chlorine, Fluorine or Argon and with process conditions chosen to form tapered side walls in the trench.

4. The method as in claim 1 wherein the second material removal process is a second reactive ion etching.

5. The method as in claim 1 wherein second material removal process comprises reactive ion milling.

6. The method as in claim 1 wherein the CMP stop layer is an electrically conductive material.

7. The method as in claim 1 wherein the CMP stop layer comprises an electrically conductive material and wherein the depositing a first magnetic material comprises electroplating.

8. The method as in claim 1 wherein the CMP stop layer comprises Rh.

9. The method as in claim 1 wherein the first CMP stop layer comprises a material selected from the group consisting of Rh, Ru, Ir and Cr, 10. The method as in claim 1 wherein the non-magnetic gap layer is an electrically conductive material.

11. The method as in claim 1 wherein the non-magnetic gap layer is an electrically conductive material and the depositing a second magnetic material comprises electroplating a magnetic material.

12. The method as in claim 1 wherein the non-magnetic gap layer comprises Rh.

13. The method as in claim 1 wherein the non-magnetic gap layer comprises Rh and the depositing a second magnetic material comprises electroplating.

14. The method as in claim 1 wherein the non-magnetic gap layer comprises Rh and the depositing a second magnetic material comprises forming a third mask configured as a plating frame having an opening configured to define a trailing wrap-around shield and electroplating the second magnetic material into the opening in the third mask structure.

15. The method as in 1 claim wherein the first magnetic material comprises CoFe or NiFe.

16. The method as in claim 1 wherein the first magnetic material is deposited at least to the depth of the trench formed in the RIEable material.

17. The method as in claim 1 wherein the chemical mechanical polishing process is performed until the CMP stop layer has been reached.

18. The method as in claim 1 wherein the chemical mechanical polishing process is performed sufficiently to form a write pole with a trailing edge that is coplanar with a surface of the CMP stop layer.

19. The method as in claim 1 wherein the RIEable material is a non-magnetic material.

20. The method as in claim 1 wherein the RIEable material is a material selected from the list consisting of, alumina, SiC, $SiO_x$, Ta and $TaO_x$.

* * * * *